(12) United States Patent
Bryan et al.

(10) Patent No.: US 11,275,674 B1
(45) Date of Patent: Mar. 15, 2022

(54) OPERATIONS SUPPORT SYSTEM (OSS) TEST TOOL

(71) Applicant: T-MOBILE INNOVATIONS LLC, Overland Park, KS (US)

(72) Inventors: William P. Bryan, Gardner, KS (US); Thomas E. Feehan, Louisburg, KS (US); Erika Petzold, Olathe, KS (US); Bruce Ziegler, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 255 days.

(21) Appl. No.: 16/559,401

(22) Filed: Sep. 3, 2019

(51) Int. Cl.
*G06F 11/00* (2006.01)
*G06F 11/36* (2006.01)

(52) U.S. Cl.
CPC ........ *G06F 11/3688* (2013.01); *G06F 11/368* (2013.01); *G06F 11/3684* (2013.01)

(58) Field of Classification Search
CPC .............. G06F 11/3688; G06F 11/368; G06F 11/3684; G06F 11/30; G06F 11/3003; G06F 11/3006; G06F 11/302; G06F 11/36; G06F 11/3612; G06F 11/3616; G06F 11/3664; G06F 11/3668; G06F 11/3672; G06F 11/3676; G06F 11/3692; G06F 11/3696
See application file for complete search history.

(56) References Cited

U.S. PATENT DOCUMENTS

| | | | | |
|---|---|---|---|---|
| 5,781,720 A | * | 7/1998 | Parker ................. | G06F 11/3688 714/38.11 |
| 7,299,382 B2 | * | 11/2007 | Jorapur ............... | G06F 11/3684 703/22 |
| 9,612,947 B2 | * | 4/2017 | Fishaimer ........... | G06F 11/3692 |
| 2003/0086536 A1 | * | 5/2003 | Salzberg ................ | H04M 3/22 379/15.02 |
| 2009/0307763 A1 | * | 12/2009 | Rawlins .............. | G06F 11/3672 726/5 |

OTHER PUBLICATIONS

Lenka, Rakesh Kumar, Sunakshi Mamgain, Srikant Kumar, and Rabindra Kumar Barik. "Performance Analysis of Automated Testing Tools: JMeter and TestComplete." In 2018 International Conference on Advances in Computing, Communication Control and Networking (ICACCCN), pp. 399-407. IEEE, 2018. (Year: 2018).*

(Continued)

*Primary Examiner* — Anthony J Amoroso (57) ABSTRACT

A method of testing an operations support system (OSS). The method comprises receiving an input by a test tool executing on a computer system from a user interface of the test tool selecting an OSS application to test, querying the data store by the test tool for test system configuration information associated with the selected OSS application, automatically generating test case OSS input data by the test tool, testing a plurality of different user interface screens of the OSS by the test tool based on the test system configuration information associated with the selected OSS application and based on the automatically generated test case OSS input data, capturing screen shots of test results presented in the user interface screens of the OSS by the test tool, and storing the screen shots of test results in a test results data store.

15 Claims, 6 Drawing Sheets

(56) References Cited

OTHER PUBLICATIONS

Kim, Dae-Woo, Hyun-Min Lim, and Sang-Kon Lee. "A Case Study on Testing Activites for KT-OSS Maintenance." In International Conference on Software Engineering Advances (ICSEA 2007), pp. 77-77. IEEE, 2007. (Year: 2007).*

Fengguang, Xiong, and Han Xie. "Networked Automatic Test System based on Message-oriented Middleware." International Journal of Control and Automation 8, No. 3 (2015): 147-160. (Year: 2015).*

* cited by examiner

OPERATIONS SUPPORT SYSTEM (OSS) TEST TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software and/or computer programs desirably are tested before being put into production. Software testing can be a time consuming and expensive activity. Software testing may delay deployment of newly developed software to service usage.

SUMMARY

In an embodiment, a method of testing an operations support system (OSS) is disclosed. The method comprises receiving an input by a test tool executing on a computer system from a user interface of the test tool selecting an OSS application to test, querying a data store by the test tool for a list of different executable versions of the selected OSS application, and presenting the list of executable versions of the selected OSS application by the test tool in the user interface of the test tool. The method further comprises receiving an input by the test tool from the user interface of the test tool selecting one of the executable versions of the selected OSS application, querying the data store by the test tool for test system configuration information associated with the selected executable version of the selected OSS application, and automatically generating test case OSS input data by the test tool. The method further comprises testing a plurality of different user interface screens of the OSS by the test tool based on the test system configuration information associated with the selected executable version of the selected OSS application and based on the automatically generated test case OSS input data, capturing screen shots of test results presented in the user interface screens of the OSS by the test tool, and storing the screen shots of test results in a test results data store.

In another embodiment, a method of testing an operations support system (OSS) is disclosed. The method comprises, receiving an input by a test tool executing on a computer system from a user interface of the test tool selecting an OSS application to test and receiving an input by the test tool from the user interface of the test tool to select one of (A) querying a data store by the test tool for a list of different executable versions of the selected OSS application and (B) looking up a list of different executable versions of the selected OSS application in a locally stored spreadsheet. The method further comprises presenting the list of executable versions of the selected OSS application by the test tool in the user interface of the test tool based on the selected one of querying the data store and looking up in a locally stored spreadsheet and receiving a test level input by the test tool from the user interface of the test tool to select one of (A) executing a regression test and (B) executing a shakeout test. The method further comprises automatically generating test case OSS input data by the test tool based at least in part on the test level selection and testing a plurality of different user interface screens of the OSS by the test tool based on the test system configuration information associated with the selected executable version of the selected OSS application, based on the selected test level, and based on the automatically generated test case OSS input data.

In yet another embodiment, a method of testing an operations support system (OSS) is disclosed. The method comprises querying a data store by a test tool executing on a computer system for test system configuration information associated with a selected executable version of an OSS application and automatically generating test case OSS input data by the test tool, where test case OSS input data is associated with provisioning a communication network element. The method further comprises configuring a test system by the test tool based on the test system configuration information accessed from the data store, wherein the test system comprises an instance of the communication network element, configuring a test message queue of a messaging middleware of the test system by the test tool, sending a plurality of test messages by the test tool to the test message queue based on the automatically generated test cases, receiving responses of the test message queue by the test tool, and reading data by the test tool from a memory of the communication network element. The method further comprises determining test results by the test tool based on the responses received from the test message queue and based on the data read from the memory of the communication network element and storing the determined test results, the received responses, and the data read from the memory of the communication network element by the test tool in a test results data store.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Software systems may be tested to detect and correct problems in the software. When undetected, software problems may cause customer-facing problems that can damage customer satisfaction and brand value. Testing software typically is an arduous and expensive task. Software testing is often a manual process and, at least partly, an ad hoc, non-repeatable process. Often testers create test cases manually, on the fly. Different testers may and often do use different approaches to creating such test cases. Because testing is time consuming and expensive, often testing budgets may determine when testing is complete rather than when a rich set of test cases have been completed.

The present disclosure teaches a test tool that automatically tests an operations support system (OSS). The OSS test tool automatically creates its own test cases (e.g., test input) by reading real data entries out of existing communication network element data bases. For example, the OSS test tool may create the test cases based on reading provisioning data stored in existing data bases used by communication network elements such as mobile switching centers (MSCs) or such as authentication, authorization, accounting (AAA) servers. Some of the data entries are used unchanged. Other data entries are adapted, for example by changing a single field of the data entry to make that field of the new entry unique relative to other data entries in the associated provisioning table. This automatic creation of test cases eases the task of a human tester considerably and further promotes consistency of testing. Additionally, the automated creation of test cases based on data entries already in existing network element data bases reduces the risk of disturbing, disordering, or corrupting the data base of the test environment which might otherwise create problems for other testing operations. It is understood that testing using the OSS test tool may be complemented by manual testing. It is estimated that in some cases as much as 60% of testing of an OSS application may be completed by the OSS test tool.

In an embodiment, the OSS test tool may be used for testing OSS provisioning applications. OSSs may be used by communication service providers to manage their communication network infrastructure (e.g., the network of nodes that support communication activities of customers and/or service subscribers: voice calls and data communication). OSSs may be used to configure and/or provision a network element in the communication service provider's network. OSSs may be used to provision service for new customers and deprovision service for former customers. OSSs may be used to adapt network infrastructure as network elements are added to the network or removed from the network. OSSs may be used to monitor network health, to detect faults, and to correct faults. While the disclosure focuses on the example of an OSS test tool that tests OSS provisioning applications, it is contemplated that the teachings herein may be advantageously applied to other OSS applications (e.g., OSS applications that perform other functions not related to provisioning) and to other computer systems that are not OSSs.

It is the nature of an OSS provisioning system that its end result is creating data in a data base—this is what provisioning is, creating entries in a data store used by a network element to provide telecommunications services of one kind or another. The human tester (e.g., an initiator of the OSS test tool) may define a specific criteria for selecting the test case data for reading from the data bases, and the OSS test tool finds one or more data entries that match the criteria. The OSS test tool code injects this test case data into the system under test, for example into a front-end (user interface) or messaging middleware application programming interface (API) (e.g., message queue) that provides the interface between the OSS and the managed network elements. Depending on the OSS provisioning operation invoked, the test case may create a provisioning entry, update a provisioning entry, delete a provisioning entry, or read and present in the OSS user interface screen a provisioning entry.

The OSS test tool code determines what the results of the introduction of the test case data were: (a) does the front-end find the test case acceptable? (b) does the test case data flow through the OSS provisioning environment? And (c) does the data store have the entered test case data at the end of the operation? Was the provisioning stored in the data store? Test results are captured in screen shots and stored for Sarbanes-Oxley (SOX) regulation compliance purposes. Test results may further be determined by reading from provisioning resources such as memories and data stores accessed by network elements and comparing the entries in the memories and/or data stores to determine if the provisioning state agrees with the expected provisioning state.

The user interface that the OSS test tool provides to testers is very powerful and useful. When the tester launches a local test tool client on his or her work station, the client connects with an OSS test tool application execution on a computer system. The OSS test tool application searches the OSS in a test domain to determine what different OSS applications are available for testing and presents a list of these OSS applications in a list of an interface screen on the work station. The user selects an OSS application. The OSS test tool application then determines what different versions of executables and/or execution environments of the selected OSS application are available and presents a list of these available executables in the interface screen on the work station. The OSS test tool: determines the available executables and/or execution environments by reading from live data stores (for those testers with access) or by reading a spreadsheet (for those testers that may be outside of an enterprise firewall: there may be firewall issues related to direct access to live data stores that prevent testers outside the firewall to populate the environment) stored locally on the work station of the tester. The available executables and/or execution environments are presented in the interface on the display of the workstation. The user then selects an executable and/or execution environment for the subject application. The user then selects a test type: user interface test, messaging test, or both. The OSS test tool is able to automatically set up the selected OSS testing configuration—the selected executable of the OSS application and the OSS execution environment, thereby saving the tester both time and possibly avoiding errors in test set up.

User interface test involves the OSS test tool launching an OSS provisioning application user interface, logging into the OSS provisioning application user interface, and feeding test case data as input into the user interface fields, as though a human being were keying in this input data. Messaging testing, by contrast, circumvents the OSS provisioning application user interface and feeds the test case data into a properly formatted message in the messaging middleware. In an embodiment, the OSS test tool, when setting up the testing environment, instantiates a test message queue and connects the OSS provisioning application and/or execution environment to the test message queue. The use of a separate test message queue by the OSS test tool has the advantage of obviating the problem where a separate testing activity operating in the same test domain might remove a message from a general purpose message queue before the OSS test tool could retrieve the message, for example a message received back from the backend application acknowledging completion of a provisioning operation.

The user then selects a test level from (a) shakeout, (b) regression, or (c) sandbox. Shakeout testing may provide a simple end-to-end test that verifies that the test environment is nominally functional. Regression testing tests many additional test cases and may test every possible valid input combination for each OSS provisioning application interface screen and some invalid input combinations (e.g., to verify appropriate error handling by the OSS provisioning application user interface). In some contexts regression testing may be referred to as load testing. Sandbox testing may support testing of a specific component of an OSS provisioning application. The user identifies where screen shots of test results are to be stored. The test tool may then be launched, and it performs the testing automatically based on these limited user inputs.

The test results may also be presented on the display of the OSS test tool, for example a display presented by an OSS test tool client on a work station operated by a tester. The test results may, for example after completing a shakeout test, indicate that something is wrong in the configuration of the test environment, prompting the tester to correct the configuration before launching a regression test that will execute many more test cases. The configuration problem may be a minor error but one that breaks the end-to-end communication path of the OSS provisioning application functionality. Presenting the test results in addition to storing them may prompt the tester to correct the minor configuration problem before launching a regression test. If the end-to-end problem revealed by the shakeout test is not corrected first, it is likely all of the regression tests would fail, wasting test time and unnecessarily tying up testing resources. The rest results displayed after a regression test may comprise summary statistics of the regression test. The presentation of such summary statistics may indicate to the tester whether the testing process is converging on a clean load of OSS application software or whether a significant degradation in development software has set efforts back.

The functionality of the OSS provisioning test tool allows very complicated testing to be completed by testers who need not have deep knowledge of telecommunications systems or telecommunications functionality, since the tool provides the expertise for handling many of those matters. The OSS provisioning test tool promotes consistent testing among different testers, because the test cases are generated automatically. Because the OSS provisioning test tool executes test cases much faster than a human tester manually entering input data into an OSS provisioning application user interface screen, a richer set of test cases may be executed and support greater reliability in the final OSS provisioning application software released to a production environment.

Figure 1:
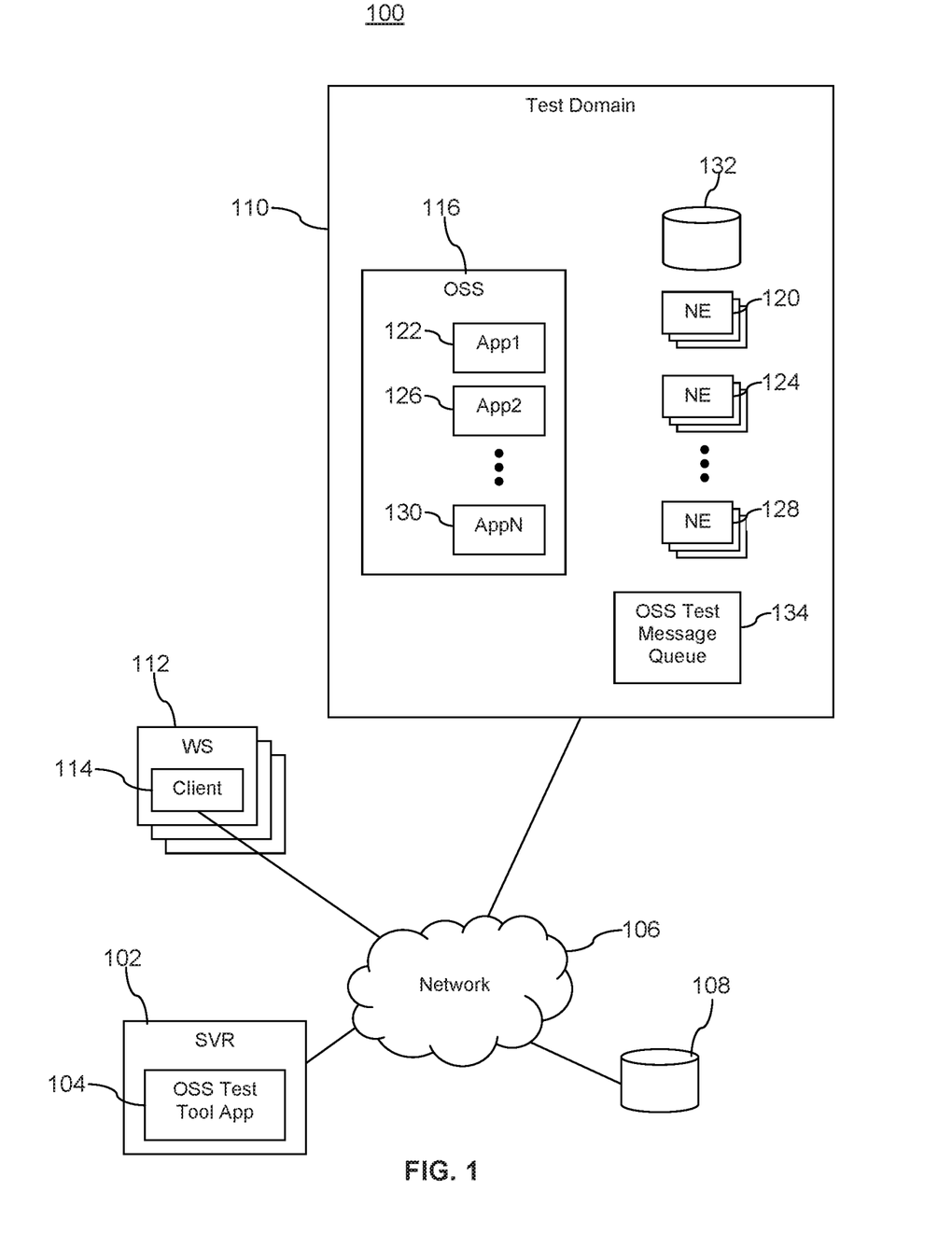
FIG. 1 is a block diagram of a system according to an embodiment of the disclosure.

Turning now to FIG. 1, a system 100 is described. In an embodiment, the system 100 comprises a computer system 102 executing an operations support system (OSS) test tool application 104. The computer system 102 is communicatively coupled to a network 106 and therethrough is communicatively coupled to a test data store 108, a test domain 110, and a plurality of work stations 112 that execute a test client 114 associated with the OSS test tool 104. Computer systems are described further hereinafter. The network 106 comprises one or more private networks, one or more public networks, or a combination thereof. The work stations 112 may be computers, for example desktop computers, laptop computers, notebook computers, and/or tablet computers. In an embodiment, the computer system 102, the data store 108 and the test domain 110 may be protected by an enterprise firewall system (not shown) located in the network 106. Some of the work stations 112 may be protected by the enterprise firewall (e.g., inside the firewall, within an enterprise domain that comprises the computer system 102, data store 108, and test domain 110) and other work stations 112 may be located outside the enterprise firewall. Work stations 112 located outside the enterprise firewall may be restricted from access to some data available inside the enterprise firewall.

In an embodiment, the test domain 110 comprises an operations support system (OSS) 116, a first network element (NE) 120, a second NE 124, and a third NE 128. The first NE 120 may be for example a mobile switching center (MSC). The second NE 124 may be for example an authentication, authorization, and accounting (AAA) server. The third NE 128 may be for example a telecommunication application server (TAS). It is understood that the test domain 110 may comprise any number of different network elements, not just the three different network elements presented here as examples. Other network elements in the test domain 110 may comprise home location registers (HLRs), visitor location registers (VLRs), gateways, Internet routers, and other network elements. The test domain 110 provides a domain for testing network elements 120, 124, 128 and the OSS 116 without interfering with handling of actual customer communication traffic. Some of the testing is directed to testing the network elements 120, 124, 128. The testing this disclosure is directed to is the testing of the OSS 116. Testing the OSS 116 inherently entails the OSS 116 interacting with NEs 120, 124, 128.

The OSS 116 is the device under test by the OSS test tool application 104. The OSS 116 may execute a plurality of OSS applications that may support provisioning, configuring, and monitoring the NEs 120, 124, 128. In an embodiment, the OSS 116 executes a first OSS provisioning application 122, a second OSS provisioning application 126, and a third OSS provisioning application 130. It is understood that the OSS 116 may execute any number of provisioning applications and any number of other applications (e.g., applications not involved with provisioning, for example fault monitoring applications). The OSS provisioning applications 122, 126, 130 may comprise a roaming provisioning application, a phone number block management provisioning application, a translations and routing provisioning application, a location based services provisioning application, a trunk provisioning application, and/or a test device management provisioning application. The OSS provisioning applications 122, 126, 130 may comprise a mobile switching center (MSC) provisioning application, an authentication, authorization, and accounting (AAA) provisioning application, a telecommunication application server (TAS) provisioning application, a home location register (HLR) provisioning application, or a visitor location register (VLR) provisioning application.

It is understood that the test domain 110 is not a live telecommunication network and does not carry customer voice traffic or customer data traffic. It is a communication network domain set up to support testing of network elements and the OSS 116 in isolation from the live telecommunication network 106. The NEs 120, 124, 128 of the test domain 110 may access a data store 132 to initialize themselves. For example, when the first NE 120 boots, part of the initialization process may comprise copying provisioning data and other initialization data from the data store 132 into a memory of the first NE 120. When the second NE 124 boots, part of the initialization process may comprise copying provisioning data and other initialization from the data store 132 into a memory of the second NE 124.

Different test organizations and/or test teams share testing access to the resources of the test domain 110. For example, some test teams are testing not the OSS 116 but rather the NEs 120, 124, 128 and/or applications and/or drivers that execute on the NEs 120, 124, 128. It is desirable that testing by one test team does not degrade or leave the resources of the test domain 110 in an anomalous state. For example, it is desirable that a test team not disturb, disorder, corrupt, or destroy provisioning information stored in the data store 132. By using OSS test case input data automatically generated by the OSS test tool application 104 the risk of disturbing the provisioning information in the data store 132 when testing the OSS 116 is reduced.

In an embodiment, the test domain 110 may further comprise an OSS test message queue 134. In some cases, the OSS test message queue 134 is instantiated pursuant to execution of the OSS test tool application 104 and in response to a user input to a user interface. Instantiating the OSS test message queue 134 may comprise configuring one of the OSS provisioning applications 122, 126, 130 to send messages to the OSS test message queue 134. Instantiating the OSS test message queue 134 may comprise configuring one of the NEs 120, 124, 128 to read from the OSS test message queue 134.

When the client 114 has provided test setup information to the OSS test tool application 104, the OSS test tool application 104 executes a test of the OSS 116 based on the test setup. In an embodiment, the testing by the OSS test tool application 104 initiated from one of the clients 114 may desirably test one of the OSS applications 122, 126, 130 at a time. In an embodiment, the OSS test tool application 104 may test multiple OSS provisioning applications 122, 126, 130 concurrently, where clients 114 associated with different work stations 112 are concurrently engaged in testing the OSS 116. In an embodiment, this may be handled by launching different instances of the OSS test tool application 104 as separate processes executing on the computer system 102.

The OSS test tool application 104 may configure the OSS 116 and the selected one of the OSS provisioning applications 122, 126, 130 for the executable version to be tested and further configures other aspects of the test domain 110 as needed for the desired testing. The OSS test tool application 104 then initiates a user interface of the OSS 116 and/or of the selected OSS provisioning application 122, 126, 130, for example by logging in with a user identity and password. The OSS test tool application 104 then invokes test cases as interactions with the user interface of the selected OSS provisioning application 122, 126, 130 and/or of the OSS 116. This may involve feeding input to fields of an interface screen of the selected OSS provisioning application 122, 126, 130 and/or of the OSS 116. This may involve composing a message based on test case data and placing the message on the OSS test message queue 134 for processing.

The OSS test tool application 104 captures results from the user interface screen of the selected OSS provisioning application 122, 126, 130 as screen shots and saves these screen shots in the data store 108. The OSS test tool application 104 may further read entries from provisioning memories associated with one or more NE 120, 124, 128 and/or from the data store 132 and compare the provisioning data against expected entries, based on the executed test cases. The OSS test tool application 104 may analyze test results, develop statistics related to the test results, and story a summary of test results and the statistics in the data store 132.

Figure 2:
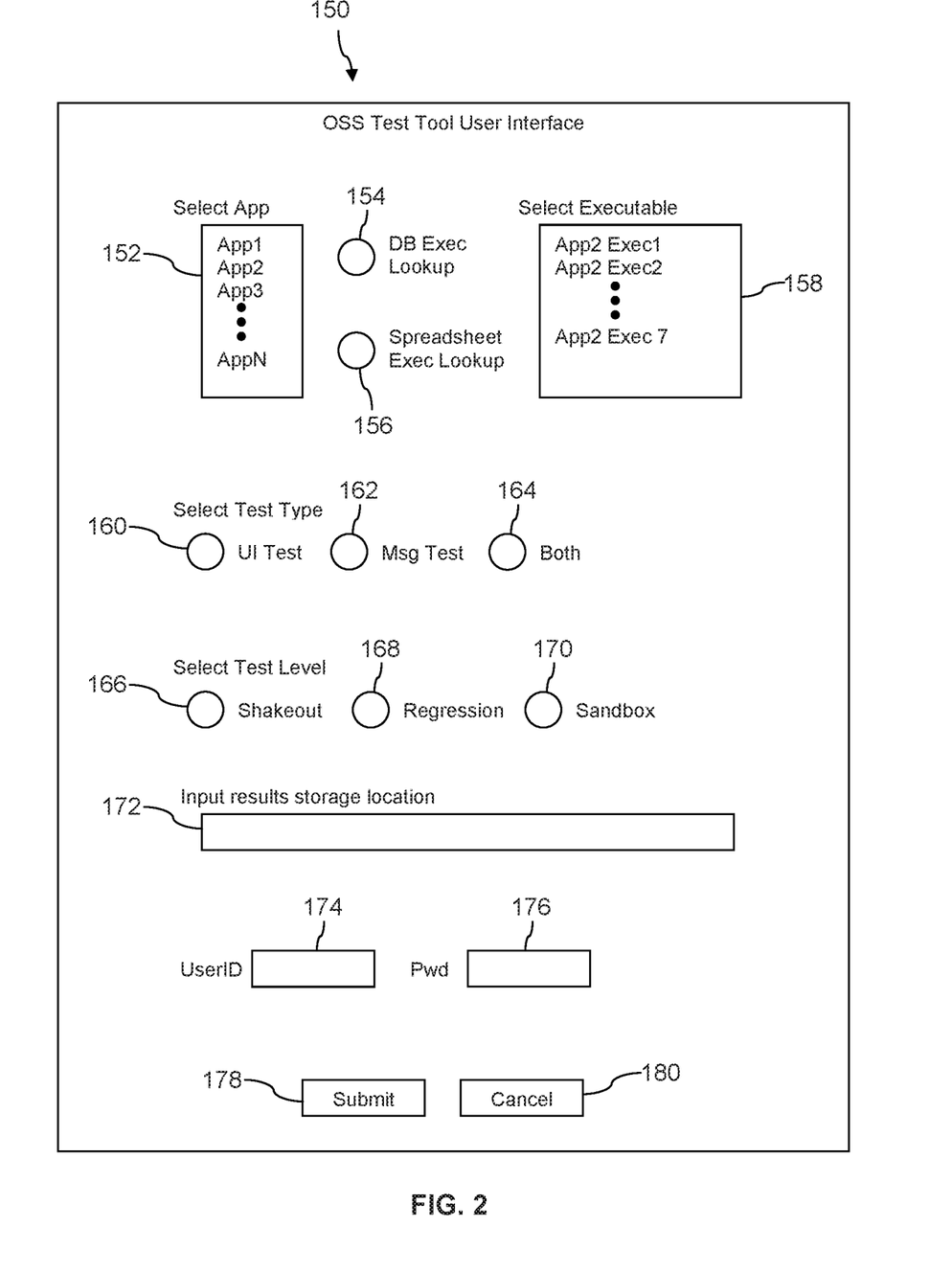
FIG. 2 is an illustration of a user interface of an operations support system (OSS) test tool according to an embodiment of the disclosure.

Turning now to FIG. 2, an OSS test tool user interface (UI) 150 is described. The UI 150 may be presented by the test client 114 on a display of the work station 112. In an embodiment, the UI 150 comprises an OSS application selection list 152. The OSS applications listed in list 152 comprise the OSS applications 122, 126, 130. These OSS applications 122, 126, 130 are applications of the OSS 116 that may be used to configure the network elements 120, 124, 128.

The UI 150 comprises a database executable lookup selection button 154 and a spreadsheet executable lookup button 156. The user selects button 154 if the work station 112 he or she is using has access to the enterprise network (e.g., inside the firewall) and is able to access the data store 108. In this instance, the OSS test tool application 104 accesses the data store 108 to identify available different executables associated with the selected application. The different executables are associated with different software versions of the selected OSS application. In some contexts, these different executables may be referred to as different environments or different execution environments. The user selects button 156 if the work station 112 he or she is using does not have access to the enterprise network. In this later instance, the test client 114 may be provided with a local copy of the list of available executables associated with the selected OSS application. The UI 150 comprises a list of executables 158 that is populated with the executable versions of the selected OSS application that are looked up after selecting button 154 or button 156. The executables associated with the selected OSS application are displayed in a list of executables 158. The user may select the desired executable for testing by clicking on the name of the executable.

The UI 150 comprises a UI test button 160, a message test button 162, and a both selection button 164. If the user selects the UI test button 160, the user interface of the selected OSS application is tested. When the UI of a OSS application 122, 126, 130 is tested, test case data is fed into input fields of the user interface of the OSS application and the user interface screen activated (e.g., a submit button is activated). If the user selects the message test button 162, the message middleware associated with the selected OSS application is tested. When the messaging middleware is tested, the test case data is formatted into an appropriate message and placed on the OSS test message queue 134 to be acted upon by the appropriate NE 120, 124, 128, thereby bypassing the UI of the OSS 116. If the user selects the both button 164, both the UI and the messaging middleware associated with the selected OSS application is tested.

The UI 150 comprises a shakeout test level button 166, a regression test level button 168, and a sandbox test button 170. The shakeout test level button 166 causes the OSS test tool application 104 to run one test on each different user interface screen associated with the selected OSS application. This may be considered to be a quick and dirty check of the basic functionality of the OSS application and/or of the test environment. For example, the shakeout test may be a simple end-to-end test that verifies accessibility to and intercommunication among the different cooperating components of the executable and computing resources. The regression test level button 168 causes the OSS test tool application 104 to run a thorough test of all the user interface screens associated with the selected OSS application. In an embodiment, the regression test level entails testing each of the user interface screens of the selected OSS application with every different combination of valid inputs for each user interface screen. In some contexts, regression test may also be called load testing or stress testing.

The UI 150 comprises an input results storage location input field 172 in which a user defines a storage location for the OSS test tool application 104 to store the end results of tests. Test results comprise snapshots of each of the user interface screens for each of the different test cases executed by the OSS test tool application 104. Test results may further comprise an analysis of which test cases failed and which test cases succeeded and a statistical summary of the test run. All of these test results are stored at a location defined by the input field 172. The test results may be stored in the data store 108. Storage of test results in this way may support compliance with Sarbanes-Oxley requirements.

The UI 150 may comprise a user identity input field 174 and a password input field 176 that the user fills to be authenticated by the OSS test tool application 104 for the right to execute the OSS test tool application 104. The user identity matched to a corresponding encrypted password may be stored in the data store 108. The OSS test tool application 104 may receive the input of the user identity 174 and the password 176 from the client 114, encrypt the received password 176, look-up the stored encrypted password based on the user identity in the data store 108, and compare the stored encrypted password to the recently encrypted password. If they match, the user may be authenticated. If they do not match, the user may be rejected. In either case, the OSS test tool application 104 does not store the password 176 provided in the clear, and hence the password 176 cannot be readily discovered by hacking the data store 108.

The UI 150 comprises a submit button 178 to launch an execution of the test tool application 104 based on the inputs provided in the UI 150. The UI 150 comprises a cancel button 180 to delete the selections in the UI 150. When launched, the test tool application 104 executes the tests on the selected OSS application 122, 126, 130 and/or on the OSS 116.

Figure 3:
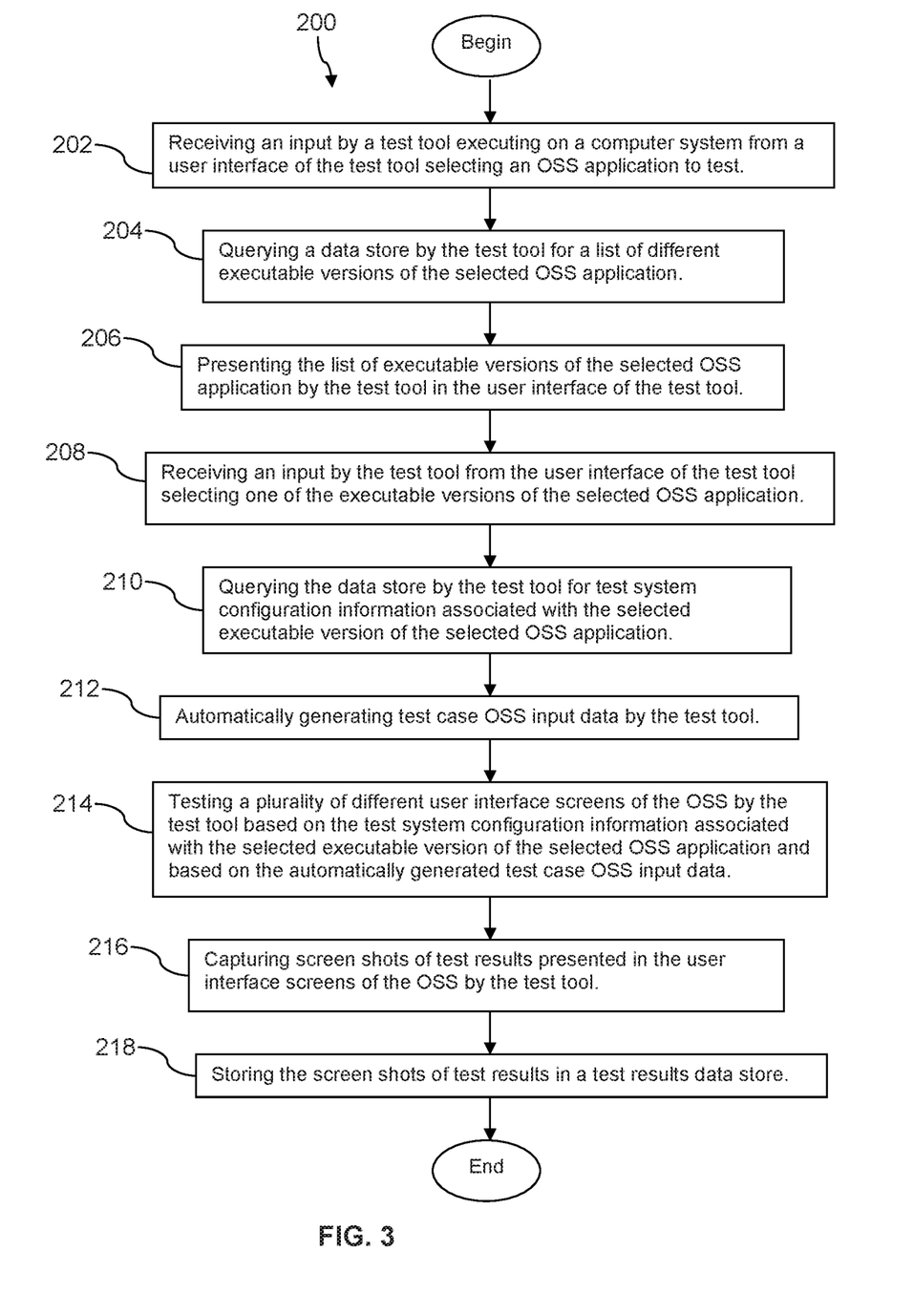
FIG. 3 is a flow chart of a method according to an embodiment of the disclosure.

Turning now to FIG. 3, a method 200 is described. In an embodiment, the method 200 is a method of testing an operations support system (OSS). At block 202, the method 200 comprises receiving an input by a test tool executing on a computer system from a user interface of the test tool selecting an OSS application to test. The input may be received from a user interface presented by a client application 114 executing on a work station 112 operated by a tester. The user interface of the test tool may identify the OSS application by the network element to which the OSS application is associated or may identify the OSS application by its provisioning function. For example, the OSS application may be identified as a mobile switching center (MSC) provisioning application, an authentication, authorization, and accounting (AAA) provisioning application, a telecommunication application server (TAS) provisioning application, a home location register (HLR) provisioning application, or a visitor location register (VLR) provisioning application. Alternatively, the OSS application may be identifies as a roaming provisioning application, a phone number block management provisioning application, a translations and routing provisioning application, or a test device management provisioning application. It is understood that other network elements and/or other provisioning functions may be supported by the method 200.

At block 204, the method 200 comprises querying a data store by the test tool for a list of different executable versions of the selected OSS application. For example the test tool queries the data store 108 for a list of executable versions of the selected OSS application. At block 206, the method 200 comprises presenting the list of executable versions of the selected OSS application by the test tool in the user interface of the test tool. At block 208, the method 200 comprises receiving an input by the test tool from the user interface of the test tool selecting one of the executable versions of the selected OSS application. At block 210, the method 200 comprises querying the data store by the test tool for test system configuration information associated with the selected executable version of the selected OSS application. For example the test tool queries the data store 108 for test system configuration information associated with the selected executable version of the OSS application.

At block 212, the method 200 comprises automatically generating test case OSS input data by the test tool. Automatically generating test case OSS input data may comprise reading provisioning information from a data store or a memory in the test domain 110, for example from a provisioning table in a memory of a network element 120, 124, 128 or from a data store 132. In some cases, the provisioning information read from the memory may be deleted, whereby the test tool may write that data back to the memory. In some cases, the provisioning information may be modified by the test tool, for example by changing a value stored in a single field of the provisioning information, for example a sequence number field or a primary key field of the provisioning information.

In an embodiment, the method 200 further comprises receiving a test level input by the test tool from the user interface of the test tool to select one of (A) executing a regression test and (B) executing a shakeout test. The number of test cases automatically generated in block 212 may be determined by the selected test level. For example if a regression test level is selected many more test cases are automatically generated than are generated for a shakeout test level. In a shakeout test, for every user interface screen of the OSS provisioning application a test case is generated for each different combination of inputs to the interface screen. For example, if an interface screen has two input fields and each of the input fields is associated with ten different valid input values, this indicates there are 100 different possible combinations of input, and 100 different test cases would automatically be generated for this single interface screen. In an embodiment, one or more additional test cases may be generated directed to providing invalid inputs to verify user interface handling of garbled or corrupted input.

At block 214, the method 200 comprises testing a plurality of different user interface screens of the OSS by the test tool based on the test system configuration information associated with the selected executable version of the selected OSS application and based on the automatically generated test case OSS input data. For example, the test tool may test a plurality of different user interface screens of the selected OSS application. The processing of block 214 (or of block 210) may comprise configuring testing resources in the test domain 110 in accordance with the test system configuration information. For example, a test message queue of a messaging middleware platform may be established and associated to the selected executable version of the selected OSS application, for example configuring the selected executable version of the OSS application to send messages to the test message queue. One or more network elements may also be configured to read from the test message queue. The test case OSS input data may be fed into the interface screens of the OSS provisioning application. The test case OSS input data may be fed into test messages and then these test messages may be sent to the test message queue. At block 216, the method 200 comprises capturing screen shots of test results presented in the user interface screens of the OSS by the test tool. For example, the test tool may capture screen shots of the user interface screens of the selected OSS application. At block 218, the method 200 comprises storing the screen shots of test results in a test results data store. In an embodiment, the test tool may further determine whether the executed test cases succeeded or failed, develop a statistical summary of the pass/fail results, and store this information in a summary report of the testing in the test results data store.

At least some of the test results may also be presented by the client application 114 on a display of the work station 112. The test results may, for example after completing a shakeout test, indicate that something is wrong in the basic configuration of the test environment, prompting the tester to correct the configuration before launching a regression test that will execute many more test cases. The configuration problem may be a minor error that is easily corrected but one that breaks the end-to-end communication path of the OSS provisioning application functionality. Presenting the test results in addition to storing them may prompt the tester to correct the minor configuration problem before launching a regression test. If the end-to-end problem revealed by the shakeout test is not corrected first, it is likely all of the regression tests would fail, wasting test time and unnecessarily tying up testing resources. The rest results displayed after a regression test may comprise summary statistics of the regression test. The presentation of such summary statistics may indicate to the tester whether the testing process is converging on a clean load of OSS application software or whether a significant degradation in development software has set efforts back.

Figure 4:
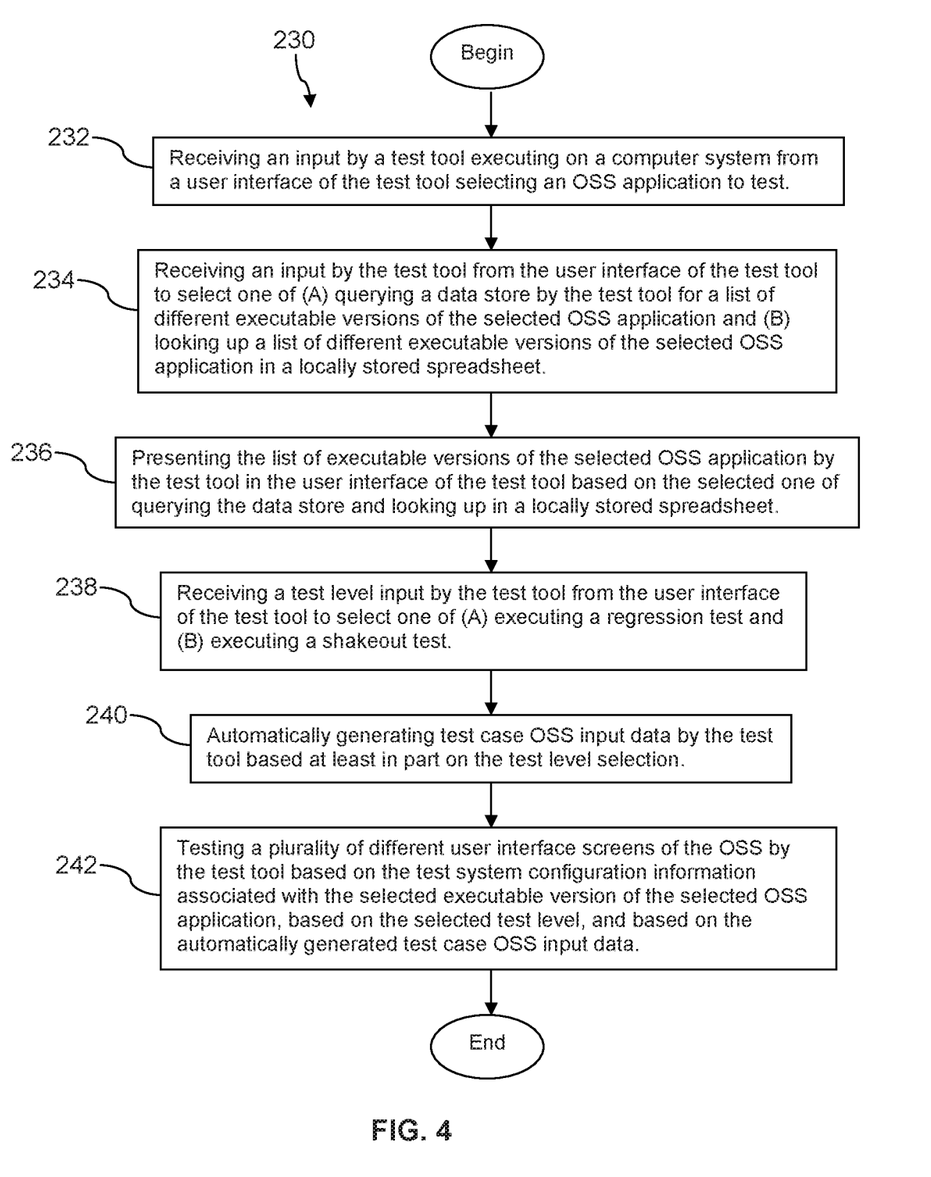
FIG. 4 is a flow chart of another method according to an embodiment of the disclosure.

Turning now to FIG. 4, a method 230 is described. In an embodiment, the method 230 is a method of testing an operations support system (OSS). At block 232, the method 230 comprises receiving an input by a test tool executing on a computer system from a user interface of the test tool selecting an OSS application to test. The input may be received from a user interface presented by a client application 114 executing on a work station 112 operated by a tester.

At block 234, the method 230 comprises receiving an input by the test tool from the user interface of the test tool to select one of (A) querying a data store by the test tool for a list of different executable versions of the selected OSS application and (B) looking up a list of different executable versions of the selected OSS application in a locally stored spreadsheet. Querying the data store by the test tool for a list of different executable versions of the selected OSS application is selected when the work station is located inside of a firewall associated with an enterprise network in which the OSS is located. Looking up the list of different executable versions of the selected OSS application in the locally stored spreadsheet is selected when the work station is located outside of a firewall associated with an enterprise network in which the OSS is located. In an embodiment, testers using work stations 112 located outside of the firewall may periodically update their locally stored spreadsheet, for example by downloading updates periodically from the OSS test tool application 104.

At block 236, the method 230 comprises presenting the list of executable versions of the selected OSS application by the test tool in the user interface of the test tool based on the selected one of querying the data store and looking up in a locally stored spreadsheet. The list of executable versions of the selected OSS application is generated either by accessing the data store or by examining the locally stored spreadsheet, as selected at block 234.

At block 238, the method 230 comprises receiving a test level input by the test tool from the user interface of the test tool to select one of (A) executing a regression test and (B) executing a shakeout test. At block 240 the method 230 comprises automatically generating test case OSS input data by the test tool based at least in part on the test level selection. At block 242, the method 230 comprises testing a plurality of different user interface screens of the OSS by the test tool based on the test system configuration information associated with the selected executable version of the selected OSS application, based on the selected test level, and based on the automatically generated test case OSS input data. For example, the test tool tests different user interface screens of the selected OSS application. The processing of block 242 may further comprise testing a messaging middleware by making calls to an application programming interface (API) of the middleware and inputting appropriate test messages corresponding to the test cases to test the middleware operation. The method 230 may further comprise capturing results of testing and storing in a storage location identified by a user of the test tool. The test results may comprise snapshots of user interface screens of the OSS, for example snapshots of the interface screens of the selected OSS application. The test results may comprise responses and status messages of the messaging middleware. The test results may comprise values read out of provisioning memory or provisioning data stores.

Figure 5:
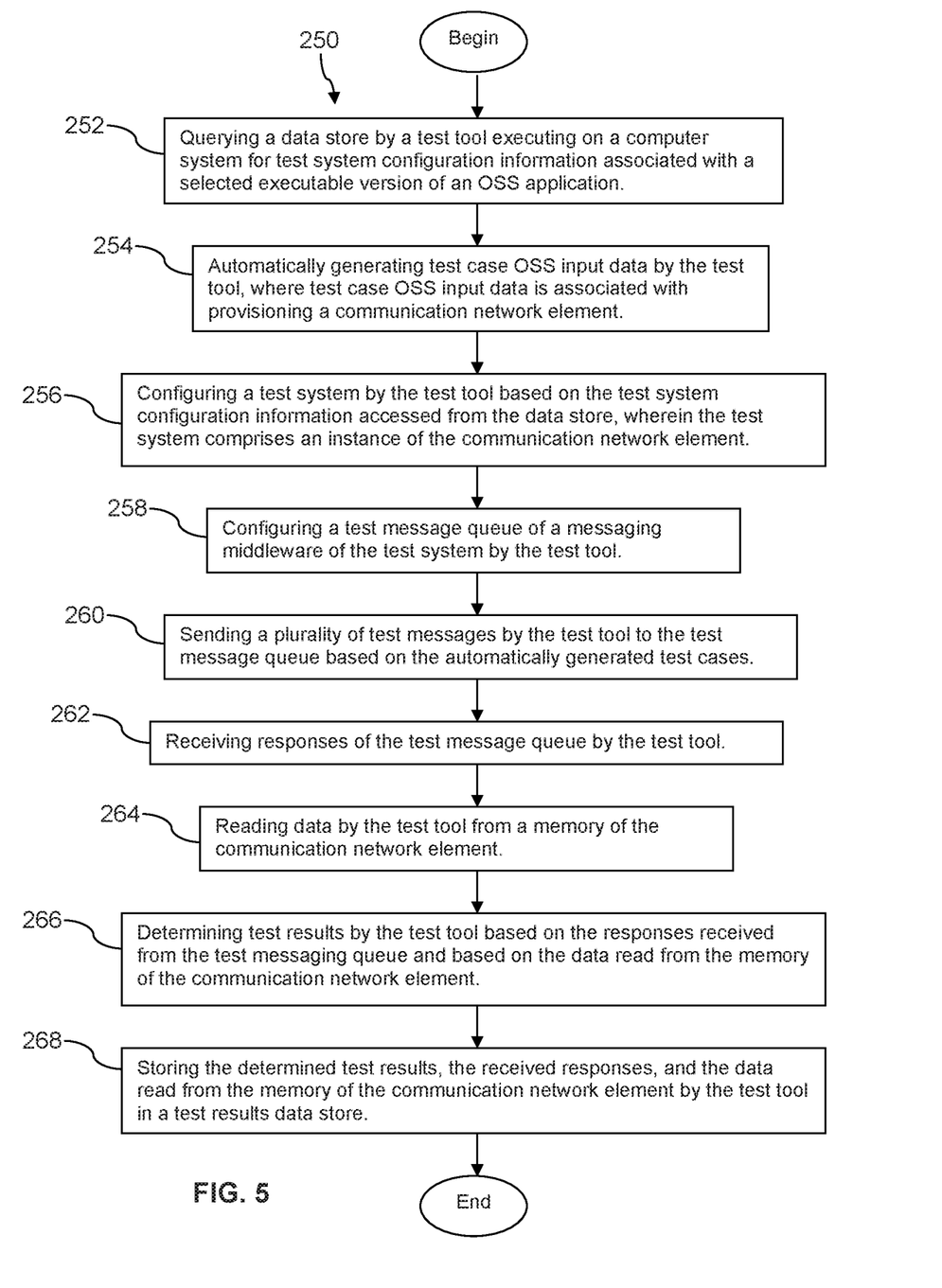
FIG. 5 is a flow chart of yet another method according to an embodiment of the disclosure.

Turning now to FIG. 5, a method 250 is described. In an embodiment, the method 250 is a method of testing an operations support system (OSS). At block 252, the method 250 comprises querying a data store by a test tool executing on a computer system for test system configuration information associated with a selected executable version of an OSS application. For example the test tool queries the data store 108 for test system configuration information associated with the selected executable version of the OSS application.

At block 254, the method 250 comprises automatically generating test case OSS input data by the test tool, where test case OSS input data is associated with provisioning a communication network element. At block 256, the method 250 comprises configuring a test system by the test tool based on the test system configuration information accessed from the data store, wherein the test system comprises an instance of the communication network element. The test system may be located in the test domain 110. The instance of the communication network element may not be connected to live customer voice traffic and not connected to live customer data traffic.

At block 258, the method 250 comprises configuring a test message queue 134 of a messaging middleware of the test system by the test tool. For example, a test message queue 134 of a messaging middleware platform may be established and associated to the selected executable version of the selected OSS application, for example configuring the selected executable version of the OSS application to send messages to the test message queue 134. The test tool may also configure one or more network elements 120, 124, 128 to read from the test message queue 134. At block 260, the method 250 comprises sending a plurality of test messages by the test tool to the test message queue 134 based on the automatically generated test cases.

At block 262, the method 250 comprises receiving responses of the test message queue 134 by the test tool. At block 264, the method 250 comprises reading data by the test tool from a memory of the communication network element. The processing of block 264 may be used to confirm that a provisioning operation has changed the data stored in a memory or data store associated with the subject network element, whereby to achieve the desired provisioning and/or configuration change initiated from the OSS interface.

At block 266, the method 250 comprises determining test results by the test tool based on the responses received from the test message queue 134 and based on the data read from the memory of the communication network element. At block 268, the method 250 comprises storing the determined test results, the received responses, and the data read from the memory of the communication network element by the test tool in a test results data store.

Figure 6:
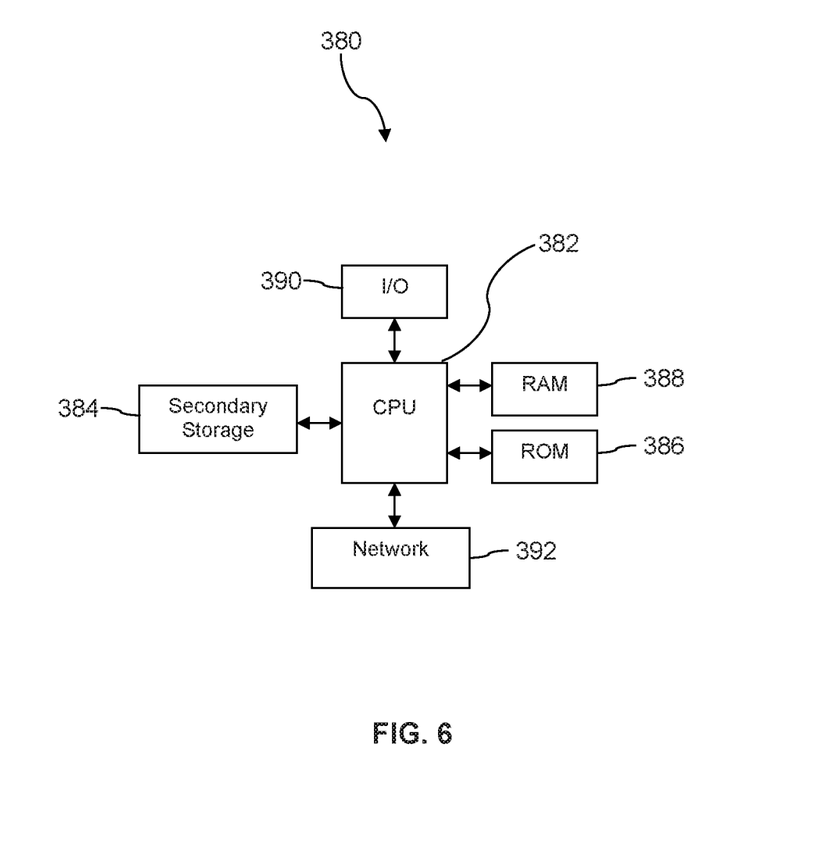
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of testing an operations support system (OSS), comprising:
receiving an input by a test tool executing on a computer system from a user interface of the test tool selecting an OSS application to test;
querying a data store by the test tool for a list of different executable versions of the selected OSS application;
presenting the list of executable versions of the selected OSS application by the test tool in the user interface of the test tool;
receiving an input by the test tool from the user interface of the test tool selecting one of the executable versions of the selected OSS application;
querying the data store by the test tool for test system configuration information associated with the selected executable version of the selected OSS application;
automatically generating test case OSS input data by the test tool, wherein automatically generating test case OSS input data comprises:
looking-up a provisioning entry by the test tool in a data store associated with the selected executable version of the selected OSS application;
deleting the looked-up provisioning entry by the test tool from the data store associated with the selected executable version or modifying a field of the looked-up provisioning entry by the test tool from the data store associated with the selected executable version; and
inputting the content of the looked-up provisioning entry by the test tool via a user interface of the selected OSS application, whereby the user interface of the selected OSS application is tested;
testing a plurality of different user interface screens of the OSS by the test tool based on the test system configuration information associated with the selected executable version of the selected OSS application and based on the automatically generated test case OSS input data;
capturing screen shots of test results presented in the user interface screens of the OSS by the test tool; and
storing the screen shots of test results in a test results data store.

2. The method of claim 1, wherein the OSS application is one of a mobile switching center (MSC) provisioning application, an authentication, authorization, and accounting (AAA) provisioning application, a telecommunication application server (TAS) provisioning application, a home location register (HLR) provisioning application, or a visitor location register (VLR) provisioning application.

3. The method of claim 1, wherein the OSS application is one of a roaming provisioning application, a phone number block management provisioning application, a translations and routing provisioning application, or a test device management provisioning application.

4. The method of claim 1, wherein different executable versions of the same OSS application comprise different software versions of the OSS application.

5. The method of claim 1, further comprising receiving an input by the test tool from the user interface of the test tool selecting a shakeout test, wherein testing the plurality of different user interface screens of the OSS by the test tool is further based on selection of the shakeout test, whereby a single test case is tested in each different user interface screen of the OSS.

6. The method of claim 1, further comprising receiving an input by the test tool from the user interface of the test tool selecting a regression test, wherein testing the plurality of different user interface screens of the OSS by the test tool is further based on selection of the regression test, whereby test cases representing each combination of valid inputs are tested in each different user interface screen of the OSS.

7. A method of testing an operations support system (OSS), comprising:
receiving an input by a test tool executing on a computer system from a user interface of the test tool selecting an OSS application to test, wherein the user interface of the test tool is provided by a client application executing on a work station separate from the computer system on which the test tool executes;
receiving an input by the test tool from the user interface of the test tool to select (A) querying a data store by the test tool for a list of different executable versions of the selected OSS application when the workstation is located inside a firewall associated with an enterprise network in which the OSS is located or (B) looking up a list of different executable versions of the selected OSS application in a locally stored spreadsheet when the work station is located outside of the firewall associated with the enterprise network in which the OSS is located;
presenting the list of executable versions of the selected OSS application by the test tool in the user interface of the test tool based on the selected one of querying the data store and looking up in a locally stored spreadsheet;
receiving a test level input by the test tool from the user interface of the test tool to select one of (A) executing a regression test and (B) executing a shakeout test;
automatically generating test case OSS input data by the test tool based at least in part on the test level selection; and
testing a plurality of different user interface screens of the OSS by the test tool based on the test system configuration information associated with the selected executable version of the selected OSS application, based on the selected test level, and based on the automatically generated test case OSS input data.

8. The method of claim 7, wherein selection of the shakeout test level input is associated with running an end-to-end test that tests accessibility and intercommunication among components of the application under test.

9. The method of claim 7, wherein selection of the regression test level input is associated with running a load test that tests many different input value options on each of the different user interface screens of the OSS.

10. A method of testing an operations support system (OSS), comprising:
querying a data store by a test tool executing on a computer system for test system configuration information associated with a selected executable version of an OSS application;

automatically generating test case OSS input data by the test tool, where test case OSS input data is associated with provisioning a communication network element, wherein automatically generating test case OSS input data comprises:
- looking-up a provisioning entry by the test tool in a data store associated with the selected executable version of the selected OSS application;
- deleting the looked-up provisioning entry by the test tool from the data store associated with the selected executable version or modifying a field of the looked-up provisioning entry by the test tool from the data store associated with the selected executable version; and
- inputting the content of the looked-up provisioning entry by the test tool via a user interface of the selected OSS application, whereby the user interface of the selected OSS application is tested;

configuring a test system by the test tool based on the test system configuration information accessed from the data store, wherein the test system comprises an instance of the communication network element;

configuring a test message queue of a messaging middleware of the test system by the test tool;

sending a plurality of test messages by the test tool to the test message queue based on the automatically generated test case OSS input data;

receiving responses of the test message queue by the test tool;

reading data by the test tool from a memory of the communication network element;

determining test results by the test tool based on the responses received from the test message queue and based on the data read from the memory of the communication network element; and storing the determined test results, the received responses, and the data read from the memory of the communication network element by the test tool in a test results data store.

11. The method of claim 10, wherein configuring the test message queue of the messaging middleware of the test system comprises configuring the selected executable version of the OSS application to send messages to the test message queue.

12. The method of claim 11, wherein other OSS applications executing in a test domain are not configured to access the test message queue.

13. The method of claim 10, further comprising receiving an input by the test tool from a user interface of the test tool to select one of (A) an OSS user interface test type and (B) an OSS messaging test type.

14. The method of claim 10, wherein selection of the OSS user interface test type is associated with the test tool providing test case data to the user interface of the OSS application.

15. The method of claim 10, wherein selection of the OSS messaging test type is associated with the test tool providing test case data to the test message queue.

* * * * *